United States Patent
Dosch et al.

(10) Patent No.: US 11,936,262 B2
(45) Date of Patent: Mar. 19, 2024

(54) ELECTRIC MOTOR AND SWITCHING UNIT THEREFOR

(71) Applicant: Brose Fahrzeugteile SE & Co. Kommanditgesellschaft, Würzburg, Würzburg (DE)

(72) Inventors: Micha Dosch, Altertheim (DE); Alexander Volkamer, Oberscheinfeld (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 955 days.

(21) Appl. No.: 16/769,797

(22) PCT Filed: Nov. 29, 2018

(86) PCT No.: PCT/EP2018/083035
§ 371 (c)(1),
(2) Date: Nov. 6, 2020

(87) PCT Pub. No.: WO2019/110420
PCT Pub. Date: Jun. 13, 2019

(65) Prior Publication Data
US 2021/0057951 A1 Feb. 25, 2021

(30) Foreign Application Priority Data
Dec. 6, 2017 (DE) ..................... 10 2017 222 076.7

(51) Int. Cl.
*H02K 3/28* (2006.01)
*H02K 1/14* (2006.01)
*H02K 11/33* (2016.01)

(52) U.S. Cl.
CPC ............... *H02K 3/28* (2013.01); *H02K 1/14* (2013.01); *H02K 11/33* (2016.01)

(58) Field of Classification Search
CPC ............ H02K 3/28; H02K 3/50; H02K 3/505; H02K 3/522; H02K 2203/06;
(Continued)

(56) References Cited

U.S. PATENT DOCUMENTS 3,854,114 A  12/1974  Kloth et al.
3,854,414 A * 12/1974  Bradbury ............... B61B 13/00
                                                 104/172.1
(Continued)

FOREIGN PATENT DOCUMENTS

CN  101588103 A  11/2009
CN  107210641 A   9/2017
(Continued)

OTHER PUBLICATIONS

Machine translation of DE-102015217017-A1. (Year: 2017).*
Machine translation of WO-2016124636-A1. (Year: 2016).*
Machine translation of WO-2010066493-A2. (Year: 2010).*

*Primary Examiner* — Michael Andrews
(74) *Attorney, Agent, or Firm* — Dickinson Wright PLLC (57) ABSTRACT

The invention relates to an electric motor (2) comprising a switching unit (8) having a number of contact wires (24) arranged in relation to a connection ring (22) for coil ends of a stator winding, and comprising an annular frame part (28) having a number of sockets (30) into each of which an insulation-displacement contact (14) with an insulation-displacement slot (52) can be inserted or is inserted, between two insulation-displacement limbs (54) for making terminal contact with at least one wire end (26) of the contact wires (24), said sockets (30) each comprising a socket slot (38), on opposing socket walls (36), which is flush with the insulation-displacement slot (52) of the insulation-displacement contact (14) plugged into said socket (30), and the two socket walls (36) of each socket (30) each have a first (Continued)

clamping contour (42) protruding into the socket slot (38), for each wire end (26) received in the socket slot (38).

5 Claims, 7 Drawing Sheets (58) Field of Classification Search
CPC ........ H02K 2203/09; H02K 1/14; H02K 1/16; H02K 11/30; H02K 11/33
USPC .................................................. 310/179, 71
See application file for complete search history.

(56) References Cited

U.S. PATENT DOCUMENTS

| 4,513,214 | A | * | 4/1985 | Dieringer | ............... | H02K 5/148 |
| | | | | | | 310/239 |
| 2003/0173854 | A1 | * | 9/2003 | Oppitz | ................... | H02K 3/522 |
| | | | | | | 310/184 |
| 2004/0006865 | A1 | | 1/2004 | Hartsfield, Jr. et al. | | |
| 2017/0331342 | A1 | * | 11/2017 | Beetz | ................... | H01R 4/2429 |

FOREIGN PATENT DOCUMENTS

| DE | 10152006 | A1 | | 5/2003 | | |
| DE | 102008054520 | A1 | | 6/2010 | | |
| DE | 102008054529 | A1 | | 6/2010 | | |
| DE | 202010016199 | U1 | | 2/2011 | | |
| DE | 102013114688 | A1 | | 6/2015 | | |
| DE | 102015217017 | A1 | | 3/2017 | | |
| DE | 102015217017 | A1 | * | 3/2017 | ............. | H02K 3/522 |
| DE | 102016206657 | A1 | | 10/2017 | | |
| EP | 0743702 | A1 | | 11/1996 | | |
| WO | 2004107531 | A2 | | 12/2004 | | |
| WO | 2010066493 | A2 | | 6/2010 | | |
| WO | WO-2010066493 | A2 | * | 6/2010 | ............. | H02K 1/148 |
| WO | 2016124636 | A1 | | 8/2016 | | |
| WO | WO-2016124636 | A1 | * | 8/2016 | ........... | H01R 4/2429 |
| WO | 2017009052 | A1 | | 1/2017 | | |

* cited by examiner

ELECTRIC MOTOR AND SWITCHING UNIT THEREFOR

CROSS-REFERENCE TO RELATED APPLICATIONS

This application is the U.S. National Phase of PCT/EP2018/083035 filed on Nov. 29, 2018, which claims priority to German Patent Application No. DE 10 2017 222 076.7, filed on Dec. 6, 2017, the disclosures of which are hereby incorporated in their entirety by reference herein.

TECHNICAL FIELD

The present disclosure relates to an electric motor, such as an electric motor for use in a motor vehicle.

BACKGROUND

A brushless electric motor has a stator with a number of stator teeth which are arranged, for example, in a star shape and which support an electric stator winding (motor winding) in the form of individual stator coils, which are in turn wound from an insulating wire. The coils are associated with individual phases by way of their coil ends and are mutually interconnected in a predetermined manner via connecting conductors of a switching unit, wherein the connecting conductors are formed, for example, as contact wires arranged annularly to form an interconnecting ring.

In the case of a brushless electric motor as a three-phase AC machine, the stator has three phases and therefore at least three connecting conductors, to which an electric current is applied in a phase-shifted manner in each case in order to generate a magnetic rotating field in which a rotor, conventionally provided with permanent magnets, rotates. The connecting conductors are routed to motor electronics for controlling the electric motor. The coils of the stator winding are interconnected with one another in a specific manner by means of the connecting conductors. The type of interconnection is determined by the winding pattern of the stator winding, wherein a star connection or a delta connection of the coils is the conventional winding pattern.

SUMMARY

The present disclosure may address one or more objects such as providing an electric motor having a reliable connection and contacting of its contact wires.

In one or more embodiments, the electric motor may include a switching unit with a number of contact wires arranged to form an interconnecting ring for coil ends of a stator winding, and with an annular frame part. In this case, the frame part may include a number of insertion pockets, into which a respective insulation displacement contact with an insulation displacement slot between two insulation displacement limbs can be inserted or is inserted for establishing clamping contact with at least one wire end of the contact wires. In other words, the, or each, insulation displacement contact may include the two mutually spaced insulation displacement limbs in each case to form the insulation displacement slot, wherein the insulation displacement slot is open on the side of the free ends of the insulation displacement limbs. On facing pocket walls, the insertion pockets furthermore have a respective pocket slot which is flush with the insulation displacement slot of the insulation displacement contact inserted into this insertion pocket. The insulation displacement slot and the pocket slot may extend axially, i.e. parallel with respect to a motor shaft. In this case, the pocket walls may define or form a clamping receptacle in which the insulation displacement contact is received in the course of the installation procedure. The number of insertion pockets or insulation displacement contacts may correspond to the number of phase connections of the electric motor.

According to one or more embodiments, both pocket walls of the respective insertion pocket which have the pocket slot furthermore have a respective first clamping contour, extending into the pocket slot, for each wire end received in the pocket slot.

The insulation displacement limbs have, on mutually facing sides, at least one region constructed in the manner of a blade so that a wire end introduced into the insulation displacement slot via the slot opening is cut and/or cut into and its wire insulation is thereby severed. In this case, the flexible insulation displacement limbs may exert a spring-like clamping force on the respective wire end (the respective wire). In the insulation displacement state of the wire or wire end, the blade edges of the insulation displacement limbs extend virtually tangentially to the conventionally approximately circular wire diameter.

The wire end to be contacted or the wire ends (wires) to be contacted may be already introduced into the pocket slots in the course of the installation procedure when the insulation displacement contact is inserted into the associated insertion pocket. In this way, the, or each, wire end received in the pocket slot may be aligned and secured by the clamping contour in such a way that the inserted wire ends are orientated substantially perpendicular to a plane which is defined by (spans) the clamping receptacle and a bending of the wire end in the insertion pocket is prevented or at least reduced. As a result of both pocket walls each having a first clamping contour, such an alignment of the, or each, wire end is improved, and the bending thereof is further reduced. In this way, a comparatively uniform and reliable contacting of the respective wire at its two flanks by the two insulation displacement limbs of the corresponding insulation displacement contact is realized.

In this case, a (clamping) force securing the wire end or the wire ends should not be so great that the pressing-in of the insulation displacement contact in the course of the installation procedure is hindered and/or the wire end or the wire ends are not bent during their introduction into the insertion pocket, such as during the winding process. The wire end or the wire ends are clamped in the first clamping contour such as a result of an at least slight deformability of insulation encompassing the wire and of the wire end itself. In this case, the clamping force is determined, or can be determined, such as, by the shape of the first clamping contour and by the depth to which this extends into the pocket slot and depending on the wire diameter and the thickness of the insulation of the wire end.

According to one or more embodiments, the first clamping contour of the respective pocket wall may be arranged on the two clamping sides thereof which flank the pocket slot. In other words, the first clamping contour is arranged on the two clamping sides of the respective pocket wall. The clamping sides refer to those sides of a pocket wall which adjoin the pocket slot, for example along the longitudinal slot direction, and therefore likewise the wire end(s) introduced into the slot. In this way, the, or each, wire end received in the slot is aligned centrally with respect to the pocket slot. Consequently, the wire end or the wire ends are also arranged centrally with respect to the insulation displacement slot which is formed by the insulation displacement limbs. Therefore, the wire end or the wire ends are advantageously stripped and cut comparatively uniformly, whereby the contacting reliability is in turn increased.

According to another embodiment, a projection which features a dome-like elevation and may include a dome slot is arranged on the outside of one of the pocket walls, which dome slot is flush with the pocket slot. In this case, the outside is that side of the pocket wall which is opposite the clamping receptacle. In a suitable embodiment, the sides flanking the dome slot have a second clamping contour, which may include a shape analogous to the first clamping contour, for example. The, or each, wire end is therefore aligned and secured by the sides of the projection which flank the dome slot. In this way, a bending of the, or each, wire end within the clamping pocket is further reduced.

According to yet another embodiment, the first and additionally or alternatively the second clamping contour is formed as a rib or as a rib pair, which extends in the longitudinal direction of the pocket slot. In an alternative embodiment, the clamping contour may include a diamond or honeycomb shape, which extends over the entire side or sides flanking the corresponding slot.

At least two wire ends may be received in one of the pocket slots and connected to the corresponding insulation displacement contact. In this way, for example, two or more contact wires are contacted by the corresponding insulation displacement contact, i.e. electrically connected to one another, so that all associated contact wires can be or are connected to a phase connection of the electric motor by merely one of the insulation displacement contacts.

To this end, the insulation displacement slot of the, or each, insulation displacement contact may include, in the longitudinal slot direction, a first slot region adjoining a slot opening on the side of the free end of the limb and a widened second slot region adjoining the first slot region. For example, the second slot region is widened in a diamond or rhombus shape.

In the course of the installation procedure, a first wire end, in the contacting process, is firstly pushed into the insulation displacement contact and cut. In this case, the wire diameter of the wire end is reduced in the region of the insulation displacement edges. The widened second region of the insulation displacement slot may receive the wire end which is firstly cut in the insulation displacement slot as soon as a second wire end arrives between the insulation displacement limbs, formed as blade edges, of the comparatively short or narrow first (cutting) region which may adjoin the slot opening. Since, in this position, the first wire end is located in the widened region of the insulation displacement slot, the necessary insulation displacement forces of the two insulation displacement limbs act on the second wire end in the cutting region situated upstream towards the slot opening. The same applies to further wire ends introduced into the insulation displacement slot. In this case the, or each, wire end is orientated normally to the slot plane of the insulation displacement contact. Furthermore, in this case, the wire diameter of those wire ends which have been introduced into the insulation displacement slot after the first wire end are cut or reduced successively by a smaller amount in each case. In other words, the wire surface used for contacting decreases successively.

According to one or more embodiments, the, or each, insulation displacement limb of the respective insulation displacement contact has at least one raised joining contour on the outside of the limb, i.e. on the side remote from the insulation displacement slot. This joining contour may cooperate with the two pocket walls of the corresponding insertion pocket which are not slotted. The joining contour depending on its shape advantageously enables a force-and/or form-fitting seat of the insulation displacement contact within the insertion pocket. By way of example, grooves, ribs, hooks and/or studs are integrally molded for this purpose, incorporated for example via a stamping technique, and may enable the force and/or form fit with corresponding mating pieces arranged on the associated pocket wall.

With regard to the switching unit, this has a number of contact wires for interconnecting coils of a stator winding with phase connections. In this case, these phase connections are each formed by an insulation displacement contact or may include these insulation displacement contacts, wherein these can be inserted or are inserted into a respective insertion pocket of a frame part. By way of example, three insulation displacement contacts are provided for the contacting of the phase connections and are arranged equidistantly from one another.

For establishing the contact between the corresponding wire end or the corresponding wire ends of the contact wires and the associated insulation displacement contact, the, or each, wire end is received in the pocket slots of the mutually facing pocket walls of the insertion pocket. In this case, the, or each, wire end is secured by two first clamping contours of both pocket walls, for example, to generate comparatively reliable contacting.

The brushless oil pump motor of a motor vehicle has an electric motor in one of the variants described above. Therefore, the oil pump motor has, for example, a switching unit with a frame part, which in turn may include a number of insertion pockets for receiving insulation displacement contacts by means of a respective pocket slot on facing pocket walls. In this case, each of the two pocket walls of the, or each, insertion pocket has a first clamping contour projecting into the pocket slot.

BRIEF DESCRIPTION OF THE DRAWINGS

Exemplary embodiments of the invention are explained in more detail below with reference to a drawing, which shows.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Mutually corresponding parts are denoted by the same reference signs in all figures.

DE 101 52 006 A1 discloses a stator with an annular stator yoke on which stator coils with coil ends and an interconnecting arrangement with connecting conductors are arranged. Receiving elements for connections of the connecting conductors are furthermore formed on the stator, which receiving elements each have a receiving means formed as a slot for the coil ends. In this case, the connections of the connecting conductors are realized as insulation displacement terminations and form an electric insulation displacement connection in pairs with the coil ends at the associated receiving elements.

WO 2016/124636 A1 discloses an electric motor with a switching unit with a number of contact wires and with an annular frame part, in which the contact wires are arranged to form an interconnecting ring for the coil ends of a stator winding and wire ends of the contact wires are connected to insulation displacement contacts. The insulation displacement contacts each have two mutually spaced insulation displacement limbs, forming an insulation displacement slot, for the connection of at least two of the wire ends, wherein the frame part of the switching unit has a number of insertion pockets, corresponding to the number of insulation displacement contacts, for receiving the insulation displacement contacts.

The contact wire to be connected to the insulation displacement contact is provided with insulating sheathing (insulation). When establishing such an insulation displacement connection, the wire or its wire end is pressed into a slot in the insulation displacement contact so that the blade-like insulation limbs of the insulation displacement contact, which flank the slot, sever the insulation at the corresponding points and cut into the wire circumferentially. In this case, it is possible that the wire, for example as a result of wire bending, is not seated centrally in the slot during the pressing-in process, so that one side of the wire is cut into to a comparatively lesser extent during the pressing-in of the insulation displacement contact, or the insulation is actually only stripped on one side. Therefore, only a comparatively small wire surface is used for contacting purposes.

When more than one wire end is connected to an insulation displacement contact, these wires can have different diameters, in particular as a result of strain thereon. As a result, a non-central alignment of the wires is promoted when the wires are pressed in successively, which again means that only a comparatively small wire surface can be used for contacting purposes.

In this case, the insertion pockets receiving the insulation displacement contacts have, on their mutually facing pocket walls, a respective pocket slot for receiving the wire. It is known from DE 10 2013 114 688 A1 and from DE 20 2010 016 199 U1 that a holding contour for the corresponding wire end is arranged on one of the two pocket walls. It is furthermore known from DE 10 2013 114 688 A1 that, to align the wire, a centering prism is formed in an end region of the bearing surface of the pocket slot.

Figure 1:
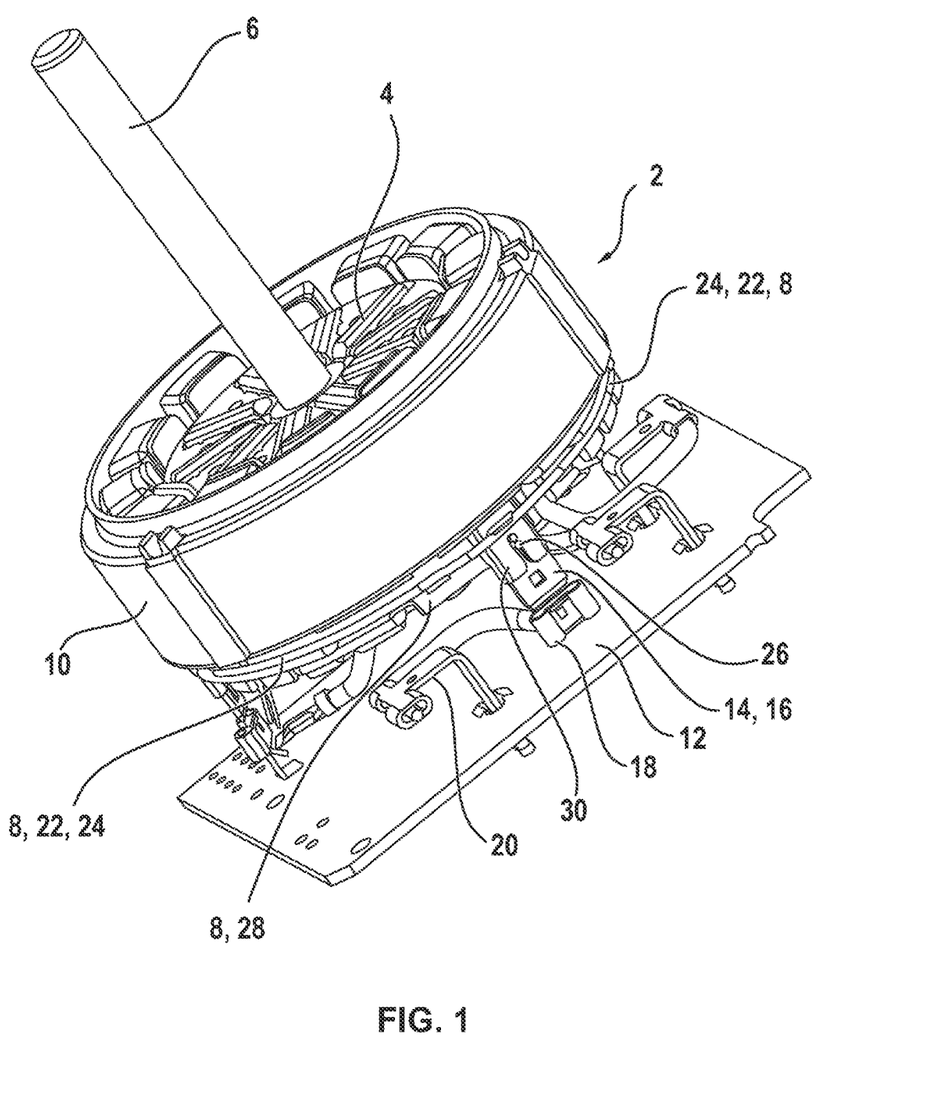
FIG. 1 in a perspective illustration, an electric motor with a stator, which is seated on a switching unit, and with a rotor and with electronics which are connected to an interconnecting ring by insulation displacement contacts, FIG. 2 in a perspective illustration, the switching unit with an annular frame part and with the interconnecting ring, wherein this latter has a plurality of contact wires arranged in a circle and wherein two wire ends of the interconnecting ring in each case are connected to the insulation displacement contacts inserted into insertion pockets of the frame part, FIG. 3a in a plan view, an insertion pocket according to the prior art, wherein two of its mutually facing pocket walls each have a pocket slot, in which a wire end is received eccentrically with respect to the pocket slot, FIG. 3b in a plan view, the insertion pocket designed according to the invention, whereof the pocket walls having the pocket slots each have a first clamping contour extending into the corresponding pocket slot and a dome-like projection which is arranged on the outside of one of the pocket walls and whereof the dome slot is flush with the corresponding pocket slot, FIG. 3c in a plan view, the insertion pocket according to FIG. 3b with a wire end received therein, FIG. 3d in a front view, the insertion pocket according to FIG. 3b with two wire ends received therein, which are each contacted by one of the insulation displacement contacts, and FIG. 4 in a perspective illustration, an insulation displacement contact with an insulation displacement slot, which is flanked by two insulation displacement limbs and which has a widened slot region.

FIG. 1 shows an electric motor 2 such as a brushless oil pump motor for a motor vehicle. The electric motor 2 has a rotor 4 and a motor shaft 6 and a stator 10 provided with a switching unit 8. The electric motor 2 furthermore has a printed circuit board (electronics) 12, which is contacted by three insulation displacement contacts 14 via their contact heads 16. In the installed state, the contact heads 16 are—according to this exemplary embodiment inserted into crimped-lug type insertion receptacles 18 of contacts (flat contacts) or contact portions 20 produced, for example, as punched and bent parts from flat wire. In this case, the contact heads 16 in FIG. 1 are shown removed from the corresponding insertion receptacles 18 in the manner of an exploded illustration for better visualization. The insulation displacement contacts 14 here form the phase connections for the three-phase energization of the stator or motor winding.

Figure 2:
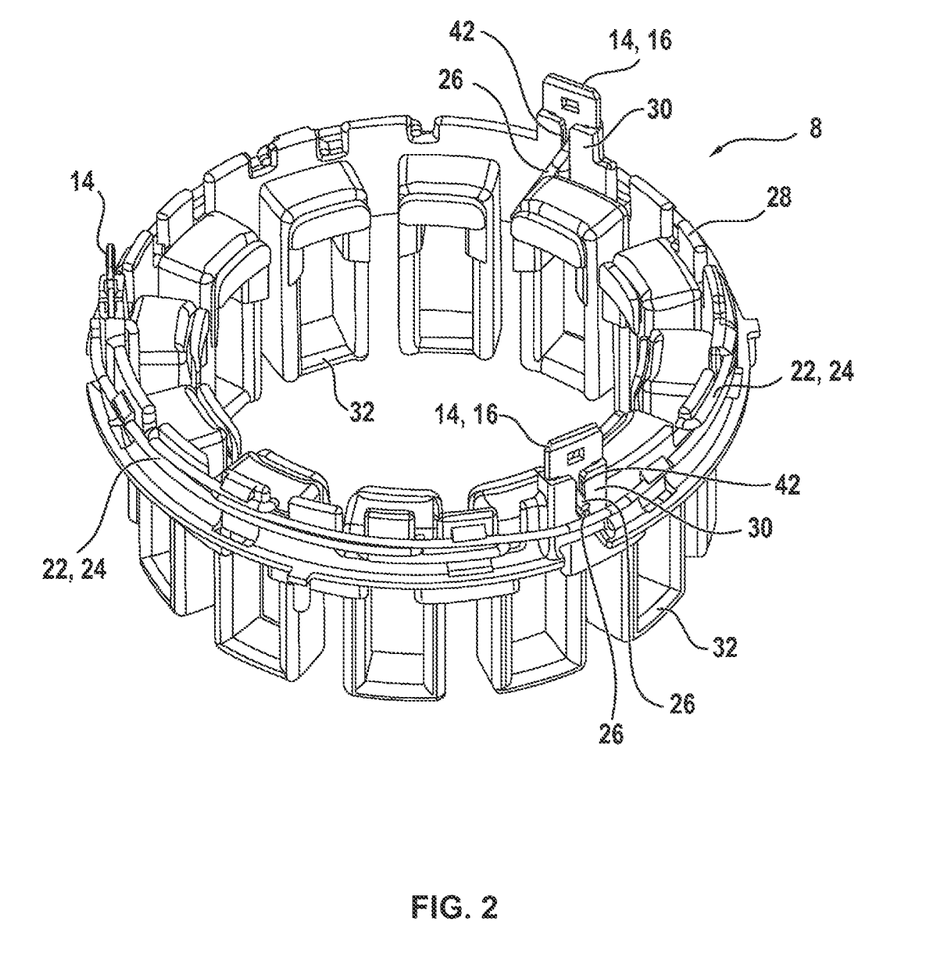

FIG. 2 shows the switching unit 8 with an interconnecting ring 22. This has a plurality of contact wires 24 arranged in a circle. In this case, two wire ends 26 of the contact wires 24 in each case are contacted by one of the three equidistantly arranged insulation displacement contacts 14.

The switching unit 8 furthermore has an annular frame part 28, which is formed, for example, from plastic. This in turn has, in the region of the respective insulation displacement contact 14, an insertion pocket 30 for receiving the insulation displacement contact 14.

Furthermore, in FIG. 2, the switching unit 8 is illustrated with complete, closed coil cassettes 32, which are integrally molded on the frame part 28 of the switching unit 8. These receive the stator teeth of the electric motor 2 in its installed state and are wound with the individual coils of the stator winding in a manner not illustrated in further detail.

Figure 3A:
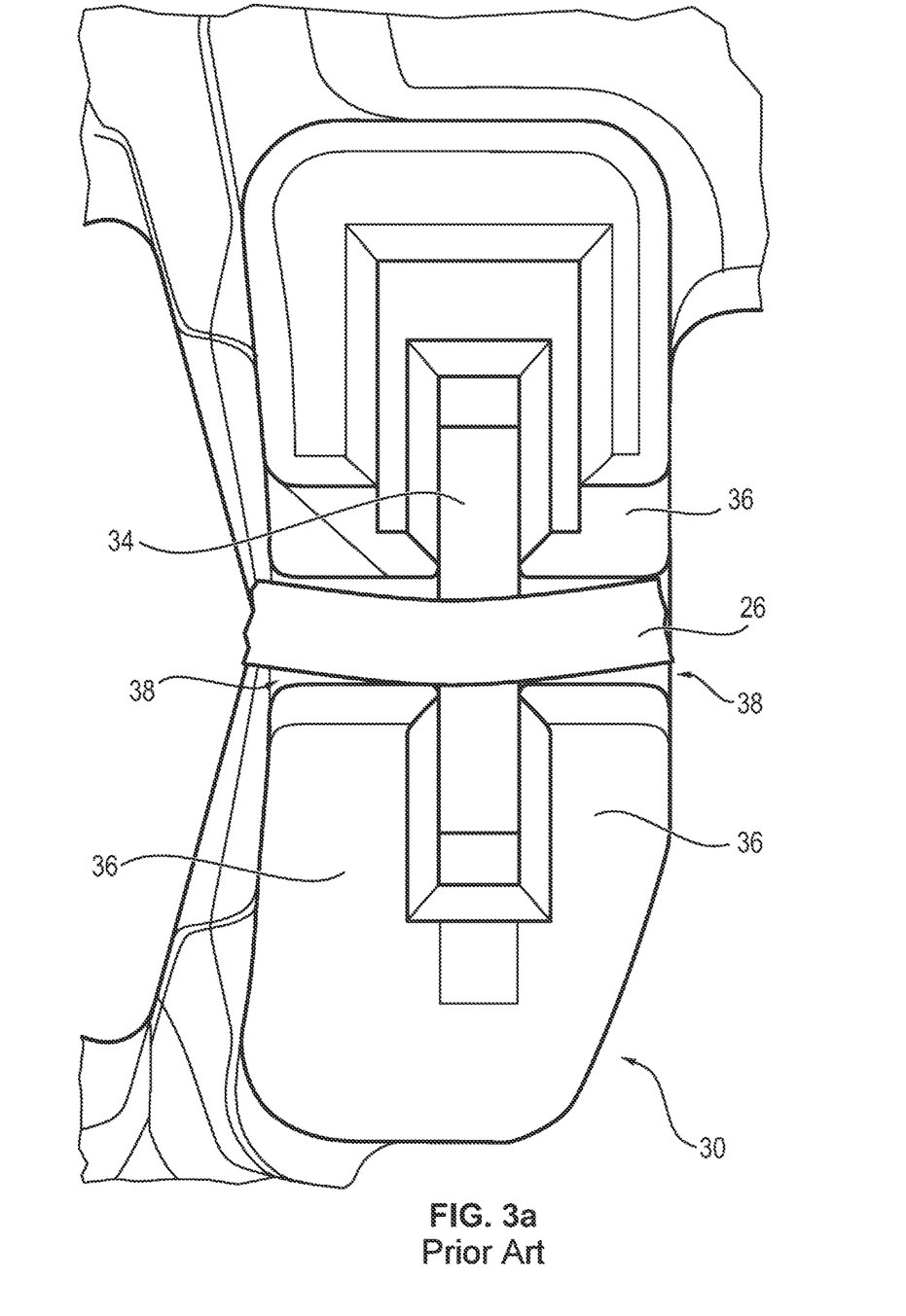

FIG. 3a shows an insertion pocket 30 according to the prior art. This has a clamping receptacle 34, in which the corresponding insulation displacement contact 14 will be or is received. In this case, the clamping receptacle 34 is encompassed circumferentially by pocket walls 36, wherein a respective pocket slot 38, in which the wire end 26 is received, is arranged on two mutually facing pocket walls 36. In this case, the two pocket slots 38 are flush with one another. The received wire end 26 has a bend and is not arranged centrally with respect to the pocket slot 38.

Figure 3B:
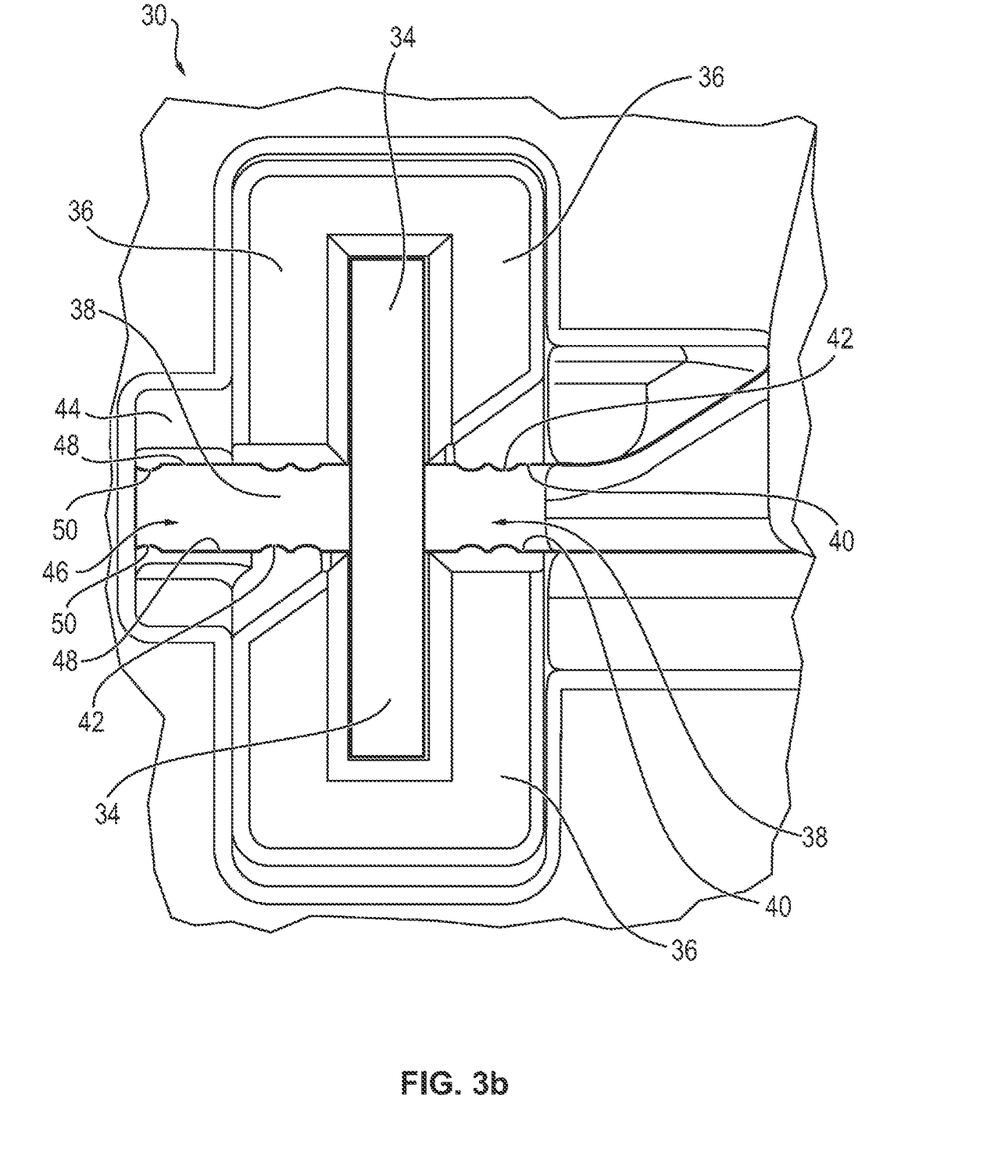

FIG. 3b shows the pocket slot 30, according to one or more embodiments, with a clamping receptacle 34, which is encompassed by pocket walls 36. Two mutually facing pocket walls 36 each have a pocket slot 38. In this case, the clamping sides 40, flanking the pocket slots 38, of the corresponding pocket walls 36 each have a first clamping contour 42.

Figure 3C:
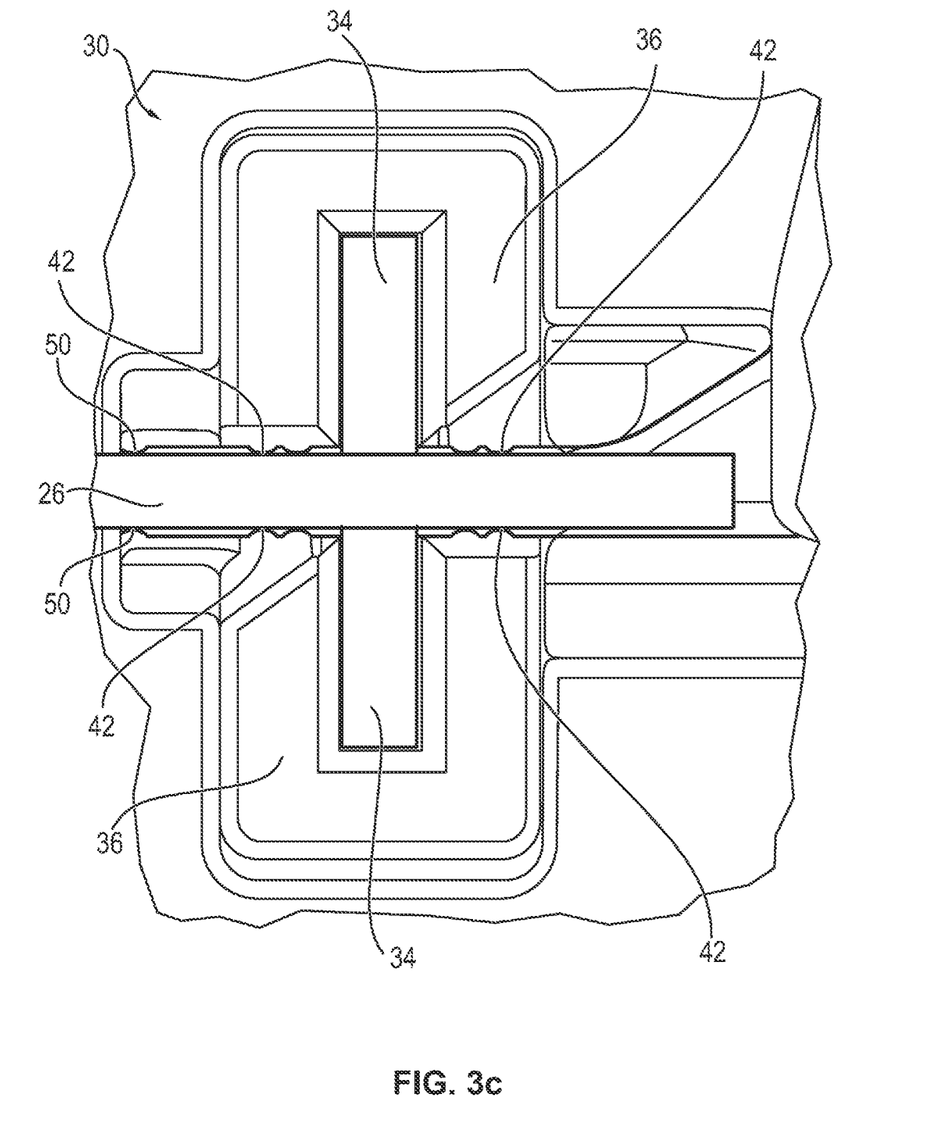

Furthermore, a projection 44, which features a dome-like elevation and has one of the pocket slots 38, is arranged on the outside of one of the pocket walls 36, which projection is integrally molded on this pocket wall 36 according to this exemplary embodiment. This projection 44 in turn has a dome slot 46, which is flush with the pocket slots 38, wherein the sides 48 flanking the dome slot 46 each have a second clamping contour 50. The first clamping contour 42 and the second clamping contour 50 are formed as ribs here, which extend along a longitudinal direction L (FIG. 3*d*) of the pocket slot 38 and the dome slot 48. In FIGS. 3*b* and 3*c*, the longitudinal direction L extends into the plane of the drawing.

FIG. 3*c* shows the insertion pocket 30 of FIG. 3*b*, wherein one of the wire ends 26 of the contact wires 24 is received therein. In contrast to FIG. 3*a*, it can be seen that the wire end 26 is aligned and secured, in particular clamped (trapped), centrally with respect to the two mutually flush pocket slots 38 by means of the first clamping contour 42 and additionally by means of the second clamping contour 50. As a result of this, the bending of the wire end 26 is additionally prevented or at least comparatively greatly reduced.

Figure 3D:
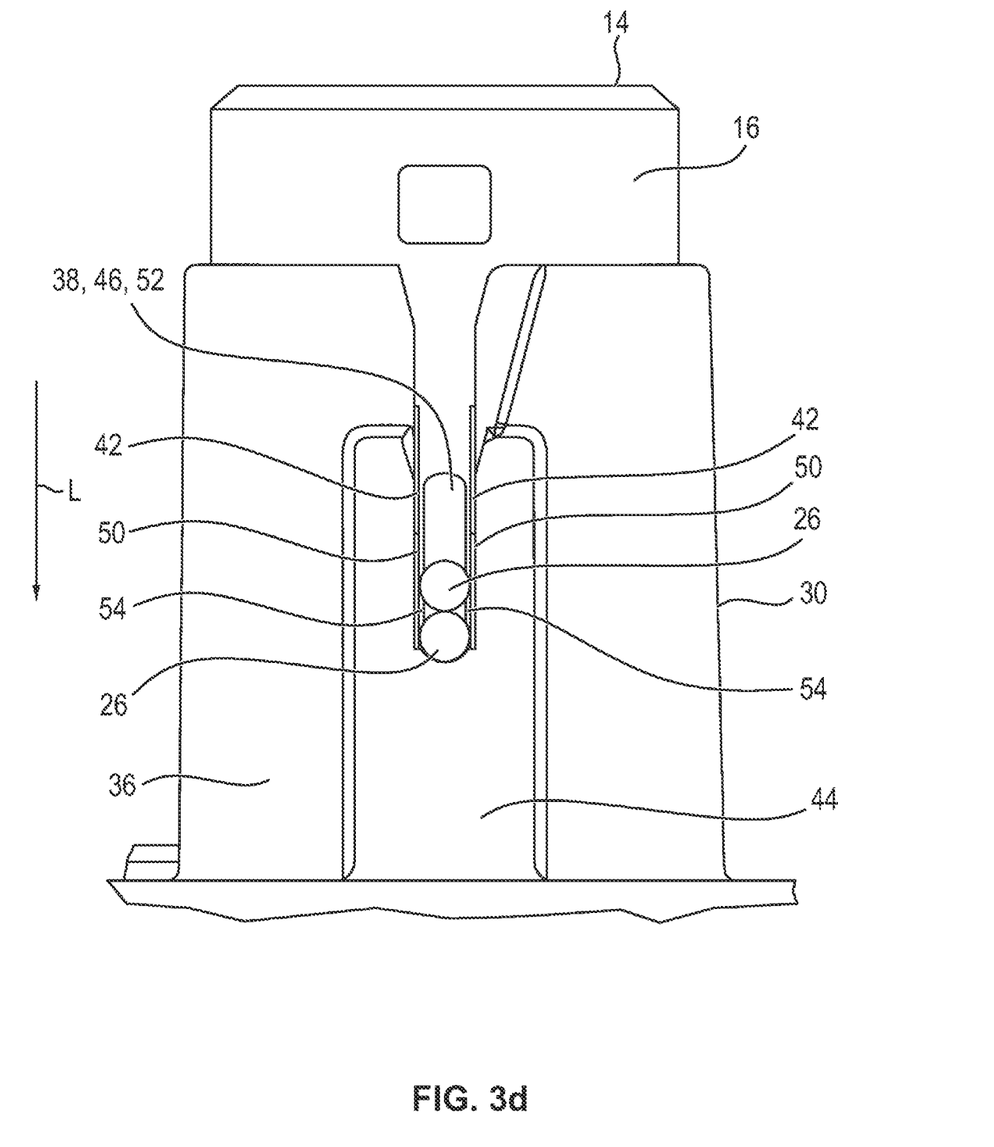

According to FIG. 3*d*, two wire ends 26 are received in the insertion pocket 30 and contacted by the corresponding insulation displacement contact 14. In this case, in the installed state of the insulation displacement contact 14 in this insertion pocket 30, an insulation displacement slot 52, which is formed between two insulation displacement limbs 54 of the insulation displacement contact 14 (FIG. 4), is flush with the pocket slots 38 of the insertion pocket and the dome slot 46. Then, owing to the two wire ends 26 being secured centrally in the pocket slot 38 during the pressing-in of the associated insulation displacement contact 14, the wire end 26 is advantageously cut uniformly by the blade-like insulation displacement limbs 52 in the course of its installation and may provide reliable contacting of the wire end 26 by the insulation displacement contact 14 is thus achieved.

According to a further variant (not illustrated further) of the insertion pocket according to the invention, a projection 44 is not arranged on thereon. The wire ends 26 are then secured merely by means of the first clamping contours 42.

According to a further variant (not illustrated further), the insertion pockets 30 of the frame part 28 shown in FIG. 2 each have a projection 44 with a second clamping contour 50 according to FIGS. 3*b* to 3*d*.

Figure 4:
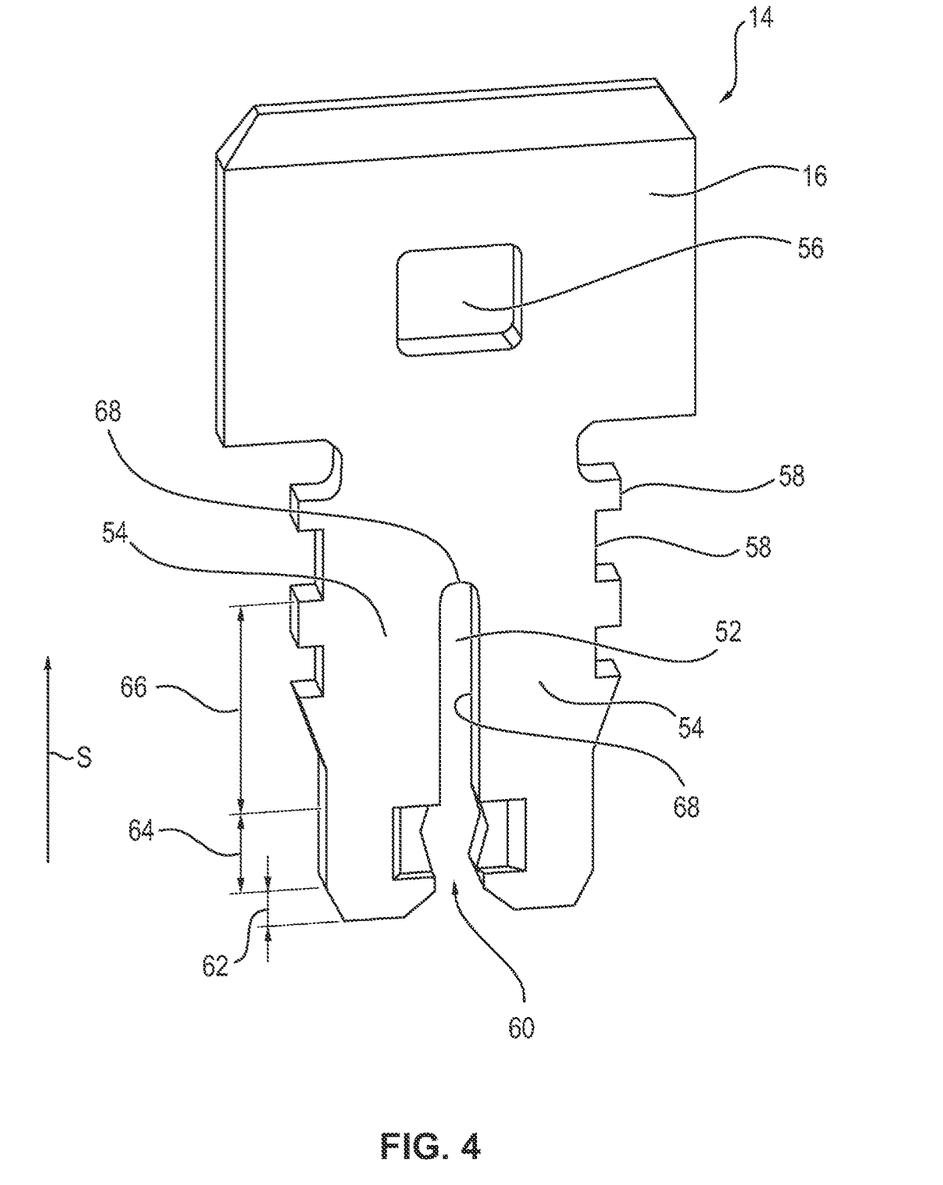

FIG. 4 shows one of the insulation displacement contacts 14 with an insulation displacement slot 52 which is flanked by two insulation displacement limbs 54 of the insulation displacement contact 14, i.e. it is located or formed between these two insulation displacement limbs 54. The insulation displacement contact 14 is may be a punched part. The insulation displacement limbs 54 of the insulation displacement contact 14 may merge into the contact head 16, which is may be provided with a through-opening (through-bore) 56. Joining contours 58 (grooves, studs) may be integrally molded or stamped on the outside of the insulation displacement limbs 54.

The insulation displacement slot 52 has a slot opening 60 in the region of the free ends of the insulation displacement limbs 54. A first, comparatively short, slot region 62 adjoins this in the longitudinal slot direction S. This slot region merges into a widened second slot region 64 in the longitudinal slot direction S. This second slot region may be diamond shaped. A third, comparatively long insulation displacement region, or at least a clamping region 66, in turn adjoins this region 64. This region 66 terminates at the ends which are opposite the free ends of the limbs, i.e. at the merging region 68 of the insulation displacement limbs 54.

As a result of this contact geometry, reliable contacting or connection of not only one wire end, but two or more wire ends, is enabled. These are inserted or pressed successively into the insulation displacement slot 52 in the longitudinal slot direction S and thereby cut circumferentially (azimuthally). The cutting depth in this case is greater than or equal to the thickness of the insulation (insulating sheath) of the, or each, wire end. To this end, the mutually facing edges of the insulation displacement limbs 54 are designed in the manner of a blade, as blade edges 68, in the region of the insulation displacement slot 52.

The invention is not restricted to the exemplary embodiments described above. Rather, the person skilled in the art is also able to derive other variants of the invention from these, without deviating from the subject matter of the invention. In particular, all individual features described in association with the exemplary embodiments can furthermore also be combined with one another in a different way without deviating from the subject matter of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

2 Electric motor
4 Rotor
6 Motor shaft
8 Switching unit
10 Stator
12 Printed circuit board
14 Insulation displacement contact
16 Contact head of an insulation displacement contact
18 Insertion pocket
20 Contact portion
22 Interconnecting ring
24 Contact wire
26 Wire end
28 Frame part
30 Insertion pocket
32 Coil cassette
34 Clamping receptacle
36 Pocket wall
38 Pocket slot
40 Clamping side
42 First clamping contour
44 Dome-like projection
46 Dome slot
48 Side flanking the dome slot
50 Second clamping contour
52 Insulation displacement slot
54 Insulation displacement limb
56 Through-opening
58 Joining contour
60 Slot opening
62 First slot region
64 Second slot region
66 Insulation displacement region
68 Blade edge
L Longitudinal direction of the pocket slot
S Longitudinal slot direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An electric motor comprising:
a switching unit provided with a number of contact wires, arranged to form an interconnecting ring for coil ends of a stator winding and an annular frame part including,
a number of insertion pockets including a first pocket wall and a second pocket wall facing the first pocket wall, wherein the first pocket wall and the second pocket wall define a pocket slot,
a dome-shaped projection disposed on an outer side of one of the pocket walls and defining a dome slot arranged flush with the pocket slot,
an insulation displacement contact, provided with two insulation displacement limbs defining an insulation displacement slot disposed between the two insulation displacement limbs, inserted into an insertion pocket of the number of insertion pockets to form a clamping contact between a wire end of a contact wire of the number of contact wires, wherein the pocket slot is positioned flush to the insulation displacement slot and the first pocket wall and the second pocket wall each define a first clamping contour extending into the pocket slot and engaging the wire end,
wherein the dome-shaped projection forms a second clamping contour flanking the dome slot,
wherein the first pocket wall and/or the dome-shaped projection include a number of ribs that form the first clamping contour and/or the second clamping contour, respectively, and wherein at least one of the ribs of the number of ribs extends in a longitudinal direction defined by the pocket slot.

2. The electric motor of claim 1, wherein one of the pocket walls of the first and second pocket walls includes a first clamping side and a second clamping side each flanking the pocket slot and defining the first clamping contour.

3. The electric motor of claim 1, wherein one of the pocket slots receives at least two wire ends, of the number of contact wires, connected to the insulation displacement contact.

4. The electric motor of claim 1, wherein the insulation displacement slot includes first slot region and a second slot region each extending in a longitudinal slot direction defined by the insulation displacement contact, wherein the first slot region is disposed on a side of a free end of the insulation displacement contact and adjoins a slot opening defined by the insulation displacement contact, and wherein the second slot region is wider than the first slot region and adjoins the first slot region.

5. The electric motor of claim 1, wherein the insulation displacement contact includes a limb provided with at least one raised joining contour extending from an outer surface of the limb.

\* \* \* \* \*